US009247515B2

(12) United States Patent
Flore et al.

(10) Patent No.: US 9,247,515 B2
(45) Date of Patent: Jan. 26, 2016

(54) ENHANCED MOBILITY SUPPORT FOR WIRELESS COMMUNICATION

(75) Inventors: Dino Flore, San Diego, CA (US); Durga Prasad Malladi, San Diego, CA (US); Etienne Chaponniere, San Diego, CA (US); Francesco Grilli, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 735 days.

(21) Appl. No.: 11/739,674

(22) Filed: Apr. 24, 2007

(65) Prior Publication Data

US 2008/0070578 A1     Mar. 20, 2008

Related U.S. Application Data

(60) Provisional application No. 60/795,075, filed on Apr. 25, 2006.

(51) Int. Cl.
*H04W 36/00* (2009.01)
*H04W 56/00* (2009.01)

(52) U.S. Cl.
CPC ...... *H04W 56/0045* (2013.01); *H04W 36/0055* (2013.01)

(58) Field of Classification Search
CPC ...... H04W 36/30; H04W 36/18; H04W 36/12
USPC .................. 455/438, 436, 442, 439; 370/329
See application file for complete search history.

(56) References Cited

U.S. PATENT DOCUMENTS

| 5,991,626 | A | * | 11/1999 | Hinz et al. | 455/436 |
| 6,101,175 | A | * | 8/2000 | Schorman et al. | 370/331 |
| 6,233,454 | B1 | | 5/2001 | Sato | |
| 6,253,083 | B1 | * | 6/2001 | Hacena et al. | 455/437 |

(Continued)

FOREIGN PATENT DOCUMENTS

| CN | 1437416 | | 8/2003 |
| CN | 1446009 | A | 10/2003 |

(Continued)

OTHER PUBLICATIONS

U.S. Appl. No. 60/784,740 Damnjanovic, filed Mar. 20, 2006.*
Written Opinion—PCT/US07/067419—International Search Authority, European Patent Office—Jan. 17, 2008.
International Preliminary Report on Patentability—PCT/US07/067419—The International Bureau of WIPO, Geneva, Switzerland—Oct. 28, 2008.

(Continued)

*Primary Examiner* — Chuck Huynh
(74) *Attorney, Agent, or Firm* — Steven A. Raney

(57) ABSTRACT

Techniques for quickly and efficiently performing handover are described. A user equipment (UE) may maintain a link with a serving cell and may communicate with this cell via the established link. The UE may have a candidate set of non-serving cells that are candidates for handover. The UE may maintain uplink synchronization with one or more non-serving cells in the candidate set, without having to maintain links with any of the non-serving cells. The UE may update uplink synchronization with the non-serving cells via an access procedure, e.g., send access probes to the non-serving cells and receive timing adjustments from these cells. One non-serving cell with which the UE has maintained uplink synchronization may be selected as a target cell for handover. The UE may then perform handover from the serving cell to the target cell, without performing uplink synchronization during the handover, which may improve handover latency and success rate.

24 Claims, 6 Drawing Sheets

(56) References Cited

U.S. PATENT DOCUMENTS

| | | |
|---|---|---|
| 6,636,568 B2 | 10/2003 | Kadous |
| 6,907,245 B2 | 6/2005 | Ohlsson et al. |
| 2002/0068566 A1 | 6/2002 | Ohlsson et al. |
| 2002/0068571 A1* | 6/2002 | Ohlsson et al. ............... 455/442 |
| 2005/0075110 A1* | 4/2005 | Posti et al. ................ 455/452.1 |
| 2005/0215201 A1 | 9/2005 | Cao et al. |
| 2005/0272426 A1* | 12/2005 | Yang et al. .................... 455/436 |
| 2007/0183361 A1* | 8/2007 | Damnjanovic et al. ....... 370/328 |

FOREIGN PATENT DOCUMENTS

| | | |
|---|---|---|
| CN | 1578490 A | 2/2005 |
| GB | 2372407 A | 8/2002 |
| JP | 10126830 A | 5/1998 |
| JP | 2005278193 A | 10/2005 |
| JP | 2006510279 T | 3/2006 |
| RU | 2277762 C2 | 6/2006 |
| RU | 2335852 C2 | 10/2008 |
| WO | 9962285 | 12/1999 |
| WO | WO0232179 A1 | 4/2002 |
| WO | 03017621 | 2/2003 |
| WO | WO2004056144 A1 | 7/2004 |
| WO | WO2005048506 A2 | 5/2005 |

OTHER PUBLICATIONS

3rd Generation Partnership Project, "Technical Specification Group Radio Access Network; Evolved UTRA and UTRAN; Radio Access Architecture and Interfaces (Relase 7)", 3GPP TR R3.018, V0.6.0 (Oct. 2006).

3GPP TR 25.922 version 6.3.0 Release 6 (Mar. 2006): "3rd Generation Partnership Project; Technical Specification Group Radio Access Network; Radio Resource Management Strategies", pp. 1-88.

International Search Report—PCT/US07/067419—International Search Authority, European Patent Office, Jan. 17, 2008.

Translation of Office Action in Russian application 2008146408 corresponding to U.S. Appl. No. 11/739,674, citing US20020068571, RU2277762, US20020068566 and GB2372407 dated Feb. 15, 2011.

Motorola., et al., "E-UTRA Random Access Channel TP", 3GPP Draft; R1-061083-RACH-TP-Final, 3rd Generation Partnership Project (3GPP), Mobile Competence Centre ; 650, Route Des Lucioles ; F-06921 Sophia-Antipolis Cedex ; France, vol. RAN WG1, No. Athens, Greece; 20060401, Apr. 1, 2006, XP050101973, [retrieved on Apr. 1, 2006].

Taiwan Search Report—TW096114646—TIPO—May 11, 2011.

\* cited by examiner

ENHANCED MOBILITY SUPPORT FOR WIRELESS COMMUNICATION

The present application claims priority to provisional U.S. Application Ser. No. 60/795,075, entitled "Enhanced Mobility Support for LTE," filed Apr. 25, 2006, assigned to the assignee hereof and incorporated herein by reference.

BACKGROUND

I. Field

The present disclosure relates generally to communication, and more specifically to techniques for supporting mobility for wireless communication.

II. Background

Wireless communication networks are widely deployed to provide various communication services such as voice, video, packet data, messaging, broadcast, etc. A wireless communication network may include many cells that support communication for many user equipments (UEs). Each UE may communicate with a cell designated to serve that UE. This cell is often referred to as a serving cell.

A UE may be mobile and may move throughout a wireless network. The UE may be handed over from a serving cell to a new cell, e.g., if the signal quality of the new cell is good and the signal quality of the serving cell is poor. The handover may be achieved by performing a handover procedure between the UE, the serving cell, and the new cell. It is desirable to perform the handover procedure as quickly as possible since the signal quality of the serving cell may be deteriorating rapidly, and the UE may lose communication with the wireless network if the handover procedure is not completed quickly enough.

There is therefore a need in the art for techniques to quickly and efficiently perform handover.

SUMMARY

Techniques for quickly and efficiently performing handover for enhanced mobility support are described herein. A UE may maintain a link with a serving cell and may communicate with this cell via the established link. The UE may have a candidate set of non-serving cells that are candidates for handover. The UE may maintain uplink synchronization with one or more non-serving cells in the candidate set, without having to maintain links with any of the non-serving cells. One non-serving cell with which the UE has maintained uplink synchronization may be selected as a target cell for handover. The UE may then perform handover from the serving cell to the target cell, without having to achieve uplink synchronization during the handover. By maintaining uplink synchronization with one or more non-serving cells, uplink synchronization during the handover may be eliminated, which may improve handover latency and success rate.

In one design, uplink synchronization with a given non-serving cell may be achieved via an access procedure. The UE may send an access probe to the non-serving cell. The non-serving cell may receive the access probe, determine timing adjustment for the UE based on the received access probe, and send an access response with the timing adjustment to the UE. The UE may obtain the timing adjustment from the access response and adjust its uplink timing for the non-serving cell based on the timing adjustment.

Various aspects and features of the disclosure are described in further detail below.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Figure 1:
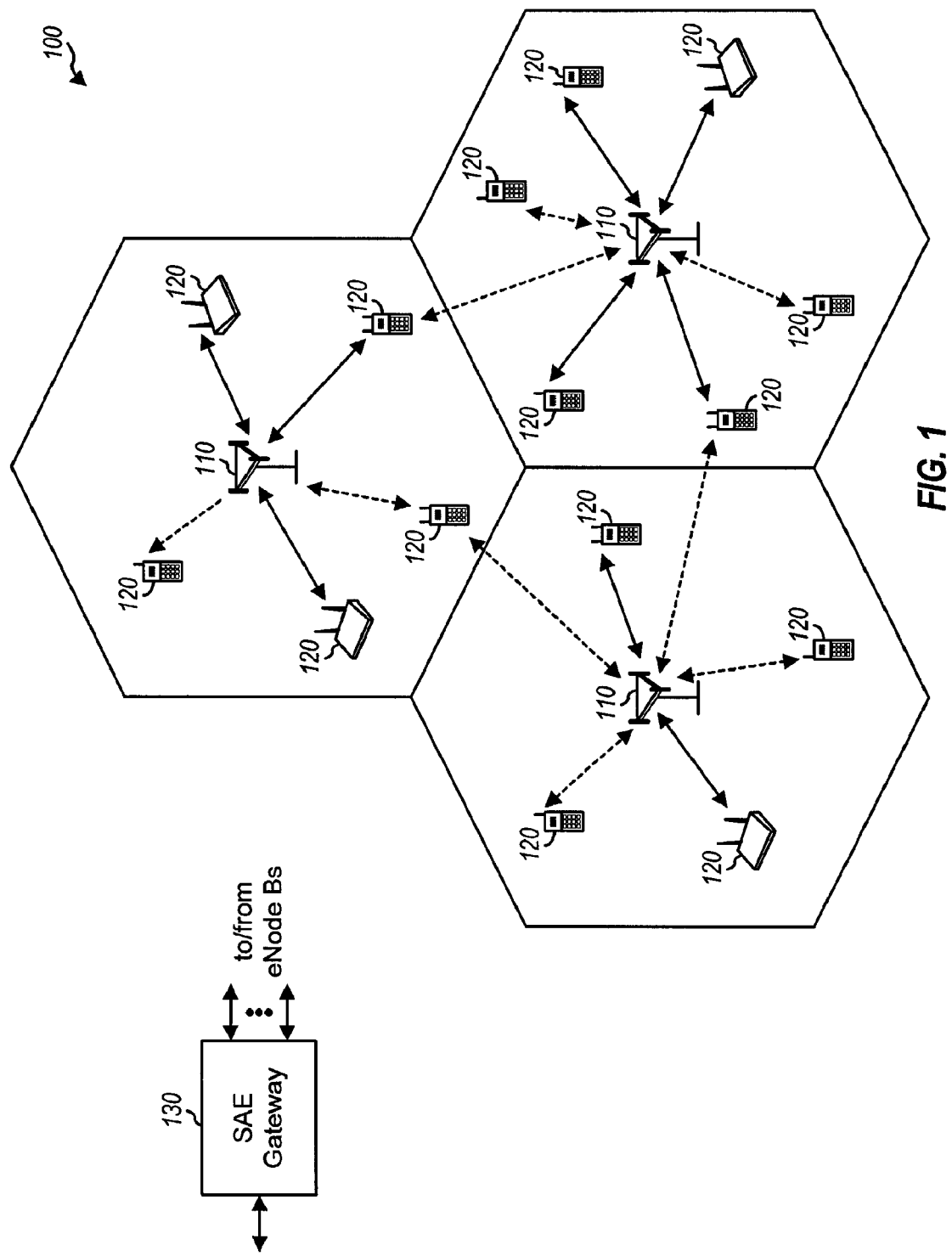
FIG. 1 shows a wireless communication network.

FIG. 1 shows a wireless communication network 100 that includes an Evolved Universal Terrestrial Radio Access Network (E-UTRAN) and a System. Architecture Evolution (SAE) gateway 130. The E-UTRAN includes multiple Evolved Node Bs (eNode Bs) 110. An eNode B is generally a fixed station that communicates with the UEs and may also be referred to as a Node B, a base station, an access point, etc. Each eNode B 110 provides communication coverage for a particular geographic area and supports communication for the UEs located within the coverage area. SAE gateway 130 couples to eNode Bs 110 and provides coordination and control for these eNode Bs. SAE gateway 130 may also originate and terminate messages for certain procedures.

UEs 120 may be dispersed throughout the wireless network, and each UE may be stationary or mobile. A UE may also be referred to as a mobile station, a terminal, an access terminal, a subscriber unit, a station, etc. A UE may be a cellular phone, a personal digital assistant (PDA), a wireless device, a handheld device, a wireless modem, a laptop computer, a cordless phone, etc. A UE may communicate with an eNode B on the downlink and/or uplink. The downlink (or forward link) refers to the communication link from the eNode Bs to the UEs, and the uplink (or reverse link) refers to the communication link from the UEs to the eNode Bs.

Each eNode B may support one or more cells. A cell may refer to a geographic area and a frequency range within which a UE can operate without having to invoke mobility procedure. For example, the coverage area of an eNode B may be partitioned into multiple (e.g., three) smaller areas, and each smaller area may correspond to a different cell supported by the eNode B. As another example, an eNode B may operate on multiple frequency carriers and may support a cell on each carrier. In general, the term "cell" may refer to an eNode B and/or its coverage area for a given frequency range/carrier, depending on the context in which the term is used.

In LTE, a UE may have a single link with a single cell at any given moment. A link is a communication means between two entities and may be associated with certain attributes such as assigned radio resources, traffic and signaling channels, protocol states, etc. The cell with which the UE has a link is referred to as a serving cell. The UE may send data to and/or receive data from the serving cell via the established link. In LTE, the UE does not maintain any link with any non-serving cell and is not able to exchange data with any non-serving cell.

While in communication with the serving cell, the UE may periodically make measurements for signal quality of other cells that might be received by the UE. The measurements may be used to determine whether there is a better cell than the serving cell. If a better cell is available and/or if the signal quality of the serving cell is poor, then the UE may be handed over from the serving cell to the better cell.

Figure 2:
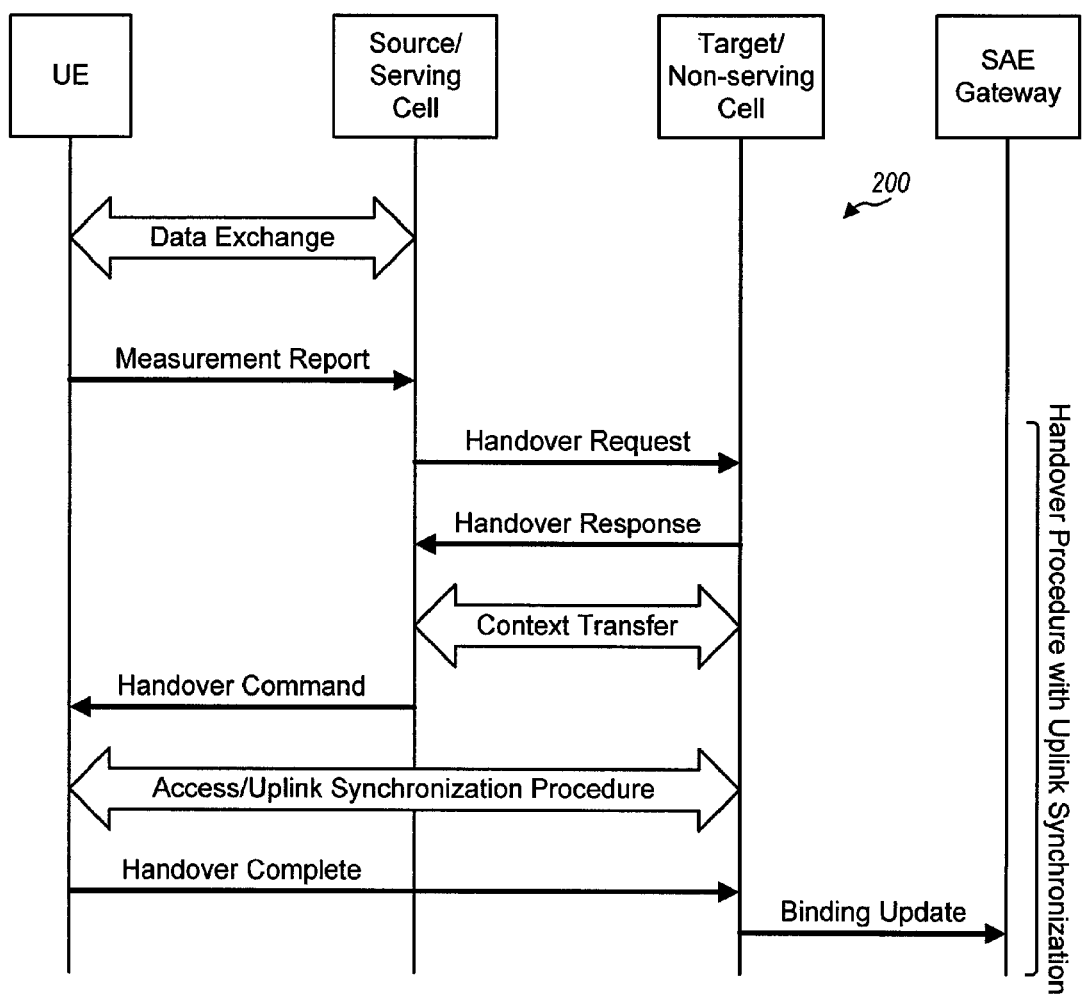
FIG. 2 shows a message flow for handover where a UE acquires uplink synchronization with a target cell during a handover procedure.

FIG. 2 shows a message flow 200 for handover where a UE acquires uplink synchronization with a target cell during a handover procedure. A UE may have established a link with a serving cell and may exchange data with the serving cell via the established link. The UE may periodically make measurements for signal quality of cells that can be received by the UE. The UE may generate a report for these measurements and may send the measurement report to the serving cell. The serving cell may determine from the measurement report that there is a better cell for the UE and may initiate handover of the UE to the better cell. For the handover, the serving cell is referred to as a source cell, and the better cell is referred to as a target cell. The source/serving cell may send a handover request to the target cell. This handover request may include pertinent information to allow the target cell to make a decision on whether to accept handover of the UE. The target cell may return a handover response, which may convey the target cell's willingness to accept the handover of the UE. The source and target cells may then exchange signaling to transfer context of the UE from the source cell to the target cell. The context may include pertinent information such as radio resources and traffic channels assigned to the UE, UE identifiers, security parameters, sequence numbers of packets received/transmitted, etc.

The source cell may then send a handover command to the UE. Upon receiving this handover command, the UE may perform an access/uplink synchronization procedure with the target cell. For this procedure, the UE may send an access probe to the target cell to request access to this cell. The target cell may receive the access probe and determine whether to accept the UE. The target cell may also determine uplink timing of the UE based on the received access probe and may determine an uplink timing adjustment such that the uplink transmission from the UE is properly time aligned at the target cell. The target cell may then send an access response to the UE. This access response may include an access grant or denial, the uplink timing adjustment for the UE, etc.

After completing the access/uplink synchronization procedure, the UE may send a handover complete message to the target cell. The target cell may then send a binding update message to the SAE gateway to inform the SAE gateway that the serving cell for the UE has been switched. Data may thereafter be exchanged between the UE and the new serving cell.

In the message flow shown in FIG. 2, the UE maintains uplink synchronization with only the serving cell. Therefore, the UE performs uplink synchronization with the target cell during handover to the target cell. This uplink synchronization may increase handover latency as well as handover failure rate.

In an aspect, to improve mobility procedure, the UE may maintain uplink synchronization with one or more non-serving cells. The UE may have a candidate set of non-serving cells that are candidates for handover. The UE may maintain uplink synchronization with one or more non-serving cells in the candidate set, without having to maintain any link with any non-serving cell. By maintaining uplink synchronization with one or more non-serving cells in the candidate set, uplink synchronization during the handover procedure may be eliminated, which may improve handover latency and success rate.

Figure 3:
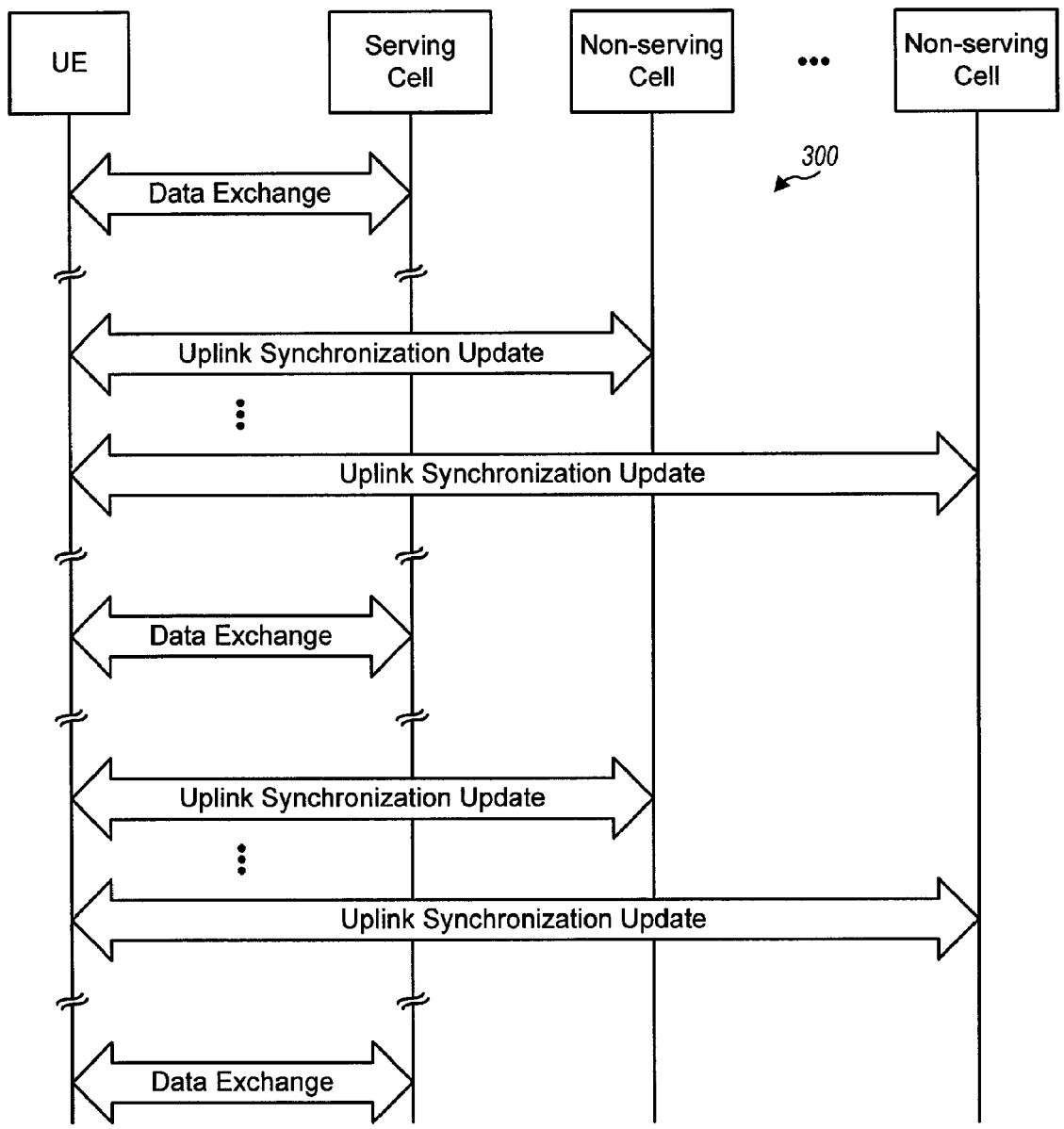
FIG. 3 shows a message flow for maintaining uplink synchronization with non-serving cells.

FIG. 3 shows a design of a message flow 300 for maintaining uplink synchronization with non-serving cells. A UE may have established a link with a serving cell and may exchange data with the serving cell via the established link. The UE may periodically make measurements for signal quality of cells in a candidate set. The candidate set may be a list of neighbor cells provided by the serving cell to the UE. The candidate set may also be formed and maintained by the UE based on measurements for cells detected by the UE. In general, the candidate set may include any cell to which the UE might potentially be handed over. The cells in the candidate set may be identified by the wireless network and/or the UE.

The UE may periodically update uplink synchronization with one or more non-serving cells in the candidate set. In one design, uplink synchronization update may be achieved using an access procedure. For this design, the UE may send an access probe on a random access channel (RACH) to a non-serving cell. The access probe may include the identity of the UE, an indication that the access probe is for uplink synchronization update instead of access request, and/or other pertinent information. The non-serving cell may receive the access probe and determine the identity and timing of the UE based on the received access probe. The non-serving cell may also determine an uplink timing adjustment for the UE and then send an access response to the UE. The access response may include the identity of the UE, the uplink timing adjustment for the UE, and/or other information. The uplink synchronization update may also be achieved in other manners. For example, uplink synchronization may be updated based on the estimated distance between the UE and an eNode B determined via a satellite positioning system such as Global Positioning System (GPS), based on uplink transmission (e.g., pilot) sent by the UE, etc.

In general, uplink synchronization update may cover update for timing, transmit power, frequency, and/or other parameters. A non-serving cell may determine timing, transmit power, frequency and/or other characteristics of the UE.

The non-serving cell may send adjustments for timing, transmit power, frequency, etc., to the UE.

The uplink synchronization update process may be controlled by the wireless network. In one design, cells in the candidate set may trigger uplink synchronization update by sending synchronization commands to the UE. In another design, the serving cell may direct the UE to perform uplink synchronization update with one or more non-serving cells. Alternatively or additionally, the uplink synchronization update process may be controlled by the UE. In one design, the UE may autonomously select any non-serving cell in the candidate set for uplink synchronization update.

In general, the UE may update uplink synchronization with any number of non-serving cells and with any non-serving cell. The UE may perform uplink synchronization update based on any one or any combination of the following:
1. Perform uplink synchronization update with only the strongest non-serving cell,
2. Perform uplink synchronization update with only non-serving cells with signal quality above a $Q_{th}$ threshold,
3. Perform uplink synchronization update with only non-serving cells with signal quality above the $Q_{th}$ threshold for at least $T_{th}$ seconds,
4. Perform uplink synchronization update with all cells in the candidate set, and
5. Perform uplink synchronization update only if the signal quality of the serving cell is below a $Q_{low}$ threshold.

The UE may perform uplink synchronization update with only a subset of the non-serving cells and/or whenever triggered by certain criteria/conditions, e.g., in order to limit the load on the RACH due to periodic uplink synchronization with non-serving cells. In one design, the UE may perform uplink synchronization update with only the strongest non-serving cell (item 1 above). In another design, the UE may perform uplink synchronization update with only non-serving cell(s) having signal quality above the $Q_{th}$ threshold (item 2). In yet another design, the UE may perform uplink synchronization update with only the strongest non-serving cell and only if the signal quality of the serving cell falls below the $Q_{low}$ threshold (items 1 and 5). In yet another design, the UE may perform uplink synchronization update with only non-serving cell(s) having signal quality above the $Q_{th}$ threshold and only if the signal quality of the serving cell falls below the $Q_{low}$ threshold (items 2 and 5). The UE may also perform uplink synchronization update based on other criteria/conditions.

The UE may be instructed by the wireless network of the criteria for which to perform uplink synchronization update. The wireless network may select the criteria based on various factors such as loading on the RACH, channel conditions of the UE, priority of the UE, etc. For example, the criteria may be more stringent (e.g., items 1 and 5 may be selected) when the RACH is more heavily loaded, when the UE channel conditions vary more slowly, etc. The same criteria may be used for all UEs, or different criteria may be used for different UEs. Alternatively, the UE may select the criteria for which to perform uplink synchronization update.

In general, the UE may perform uplink synchronization update with one or more non-serving cells at any rate. The update rate may be selected to achieve the desired timing accuracy for each non-serving cell being updated. The UE may use single-carrier frequency division multiplexing (SC-FDM) for uplink transmission, as specified in LTE, and may append a cyclic prefix to each SC-FDM symbol generated by the UE. The cyclic prefix may preserve orthogonality in case of some drift in synchronization. Hence, the UE may not need to maintain accurate uplink timing with a non-serving cell. The UE may thus perform uplink synchronization update at a relatively slow rate. In one design, the update rate may be fixed and selected, e.g., based on the highest expected speed of the UE. In another design, the update rate may be configurable and selected, e.g., based on the current UE speed.

Figure 4:
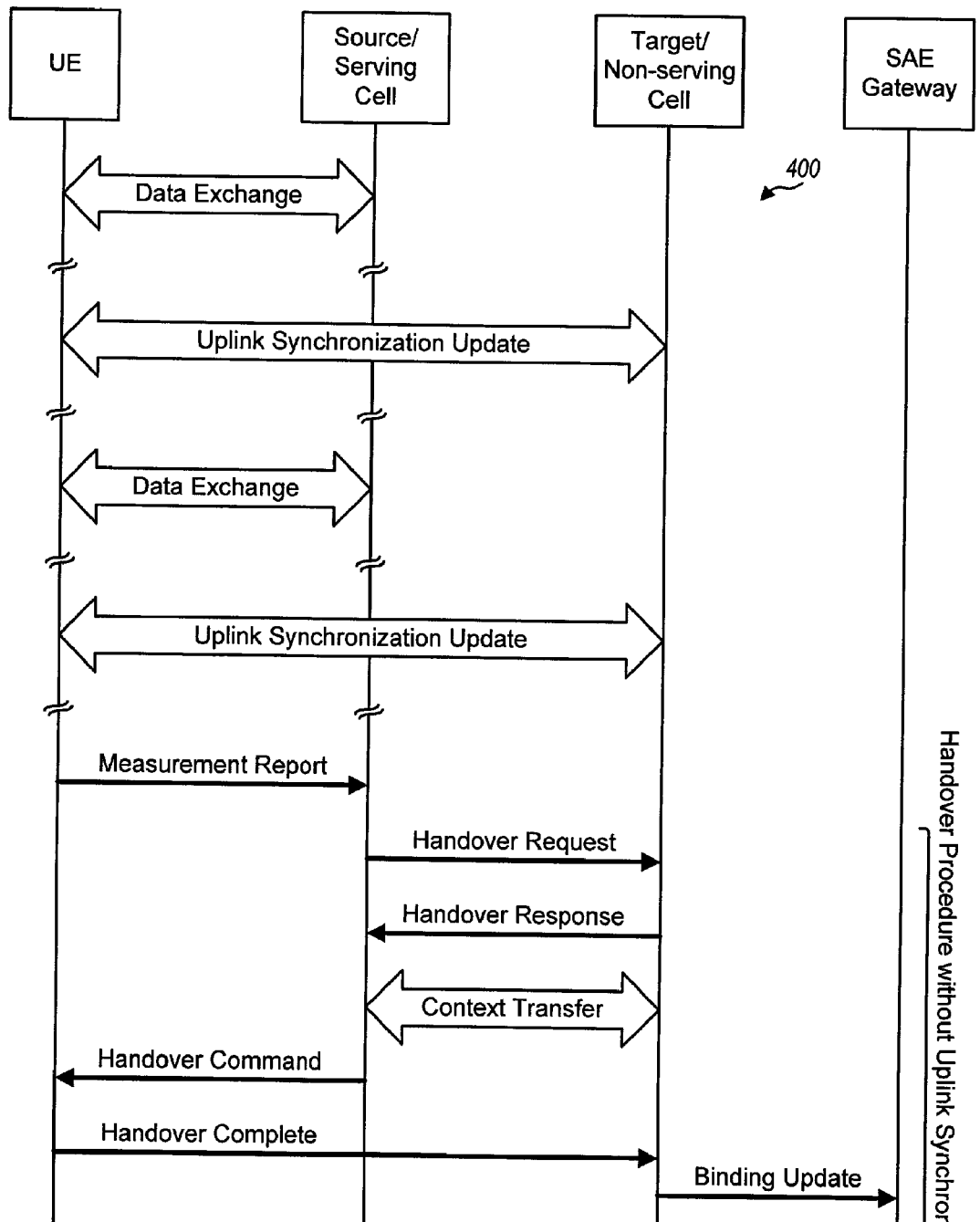
FIG. 4 shows a message flow for handover where a UE has acquired uplink synchronization with a target cell before starting a handover procedure.

FIG. 4 shows a design of a message flow 400 for fast cell switching using the techniques described herein. A UE may have established a link with a serving cell and may exchange data with the serving cell via the established link. The UE may have a candidate set of non-serving cells to which the UE might potentially be handed over. The UE may periodically perform uplink synchronization update with one or more non-serving cells in the candidate set, e.g., as described above.

The UE may periodically make measurements for signal quality of non-serving cells and may send a measurement report to the serving cell. If the UE is not able to maintain uplink synchronization with all cells in the measurement report, then the UE may indicate whether uplink synchronization has been achieve with each of the reported cells. If handover occurs toward a cell for which there is uplink synchronization, then the handover procedure in FIG. 4 may be used. If handover occurs toward a cell for which there is no uplink synchronization, then the handover procedure in FIG. 2 may be used. The serving cell may determine from the measurement report that there is a better cell for the UE and may initiate handover of the UE to this better/target cell. The source/serving cell may then send a handover request to the target cell, and the target cell may return a handover response. The source and target cells may then exchange signaling to transfer context of the UE. The target cell may assign radio resources and traffic channels to the UE and may provide this information to the UE via the source cell.

The source cell may then transmit the pertinent information in the handover command to the UE. This handover command may convey the radio resources and traffic channels assigned by the target cell to the UE and/or other pertinent information. Since the UE has periodically updated uplink synchronization with the target cell, the UE may skip the access/uplink synchronization procedure. After receiving the handover command from the source cell, the UE may send a handover complete message to the target cell to acknowledge completion of the handover. The target cell may then send a binding update message to the SAE gateway.

As shown in FIGS. 2 and 4, the UE may be able to eliminate the access/uplink synchronization procedure during the time-critical handover procedure by periodically performing uplink synchronization update prior to the handover procedure. The uplink synchronization update is not time critical and may be performed whenever convenient. The uplink synchronization update may also be performed at a relatively slow rate to avoid consuming excessive resources. By eliminating the access/uplink synchronization procedure, the handover procedure may be performed more quickly, which may result in higher handover success rate, improved performance, and greater user satisfaction.

Figure 5:
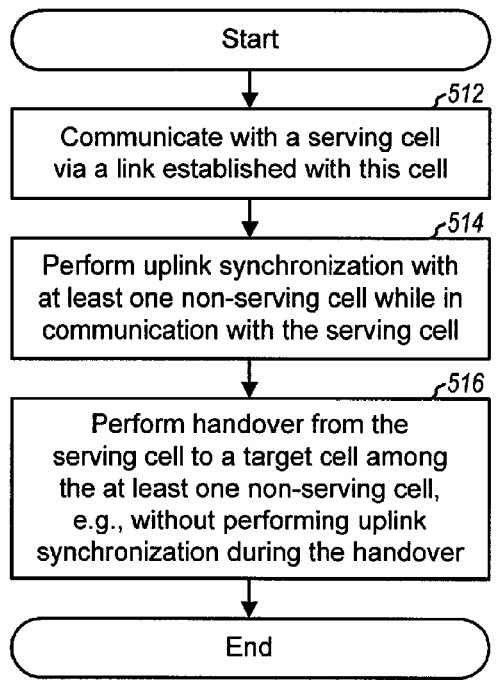
FIG. 5 shows a process performed by a UE for uplink synchronization and handover.

FIG. 5 shows a design of a process 500 performed by a UE for uplink synchronization and handover. The UE may communicate with a serving cell via a link established with this cell (block 512). The UE may maintain a link with only the serving cell and may maintain no links with non-serving cells.

The UE may perform uplink synchronization with at least one non-serving cell while in communication with the serving cell (block 514). For uplink synchronization with a given non-serving cell, the UE may send an access probe to the non-serving cell, receive an access response from the non-serving cell, obtain timing adjustment from the access response, and adjust its uplink timing for the non-serving cell based on the timing adjustment. The UE may also perform uplink synchronization in other manners.

The UE may autonomously initiate uplink synchronization or may perform uplink synchronization based on a trigger received from the serving cell and/or the non-serving cells. The UE may have a candidate set of non-serving cells that are candidates for handover. The UE may perform uplink synchronization with only the strongest cell in the candidate set, with each cell in the candidate set having signal quality above a first threshold, only if signal quality of the serving cell is below a second threshold, etc., or based on a combination of criteria. The UE may perform uplink synchronization with the at least one non-serving cell periodically at a predetermined rate, which may be fixed or configurable, e.g., selected based on the UE speed.

The UE may perform handover from the serving cell to a target cell among the at least one non-serving cell, e.g., without performing uplink synchronization during the handover (block 516). For the handover procedure, the UE may receive a handover command from the serving cell and may send a handover complete message to the target cell. Additional, fewer and/or different messages may also be exchanged by the UE for the handover.

Figure 6:
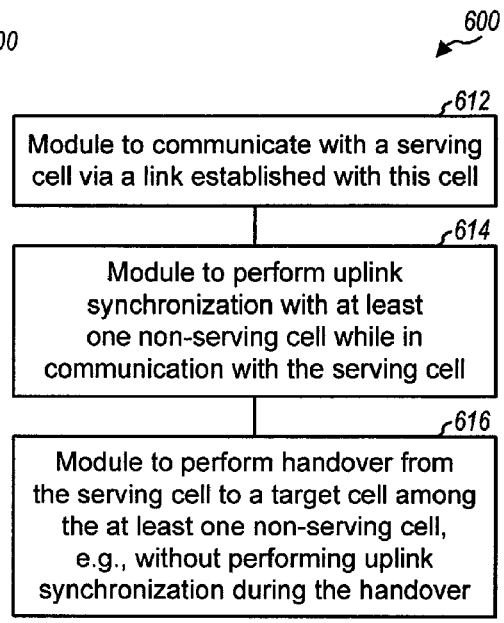
FIG. 6 shows an apparatus for a UE.

FIG. 6 shows a design of an apparatus 600 for a UE. Apparatus 600 includes means for communicating with a serving cell via a link established with this cell (module 612), means for performing uplink synchronization with at least one non-serving cell while in communication with the serving cell (module 614), and means for performing handover from the serving cell to a target cell among the at least one non-serving cell, e.g., without performing uplink synchronization during the handover (module 616). Modules 612 to 616 may comprise processors, electronics devices, hardware devices, electronics components, logical circuits, memories, etc., or any combination thereof.

Figure 7:
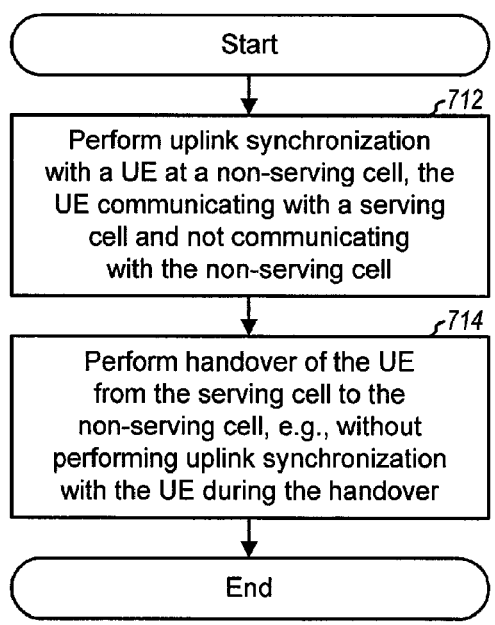
FIG. 7 shows a process performed by a target/non-serving cell.

FIG. 7 shows a design of a process 700 performed by a target/non-serving cell. The non-serving cell may perform uplink synchronization with a UE, which may be communicating with a serving cell and not communicating with the non-serving cell (block 712). For synchronization, the non-serving cell may receive an access probe from the UE, determine timing adjustment for the UE based on the received access probe, and send an access response with the timing adjustment to the UE. The non-serving cell may perform uplink synchronization with the UE periodically at a predetermined rate.

The non-serving cell may perform handover of the UE from the serving cell to the non-serving cell, e.g., without performing uplink synchronization with the UE during the handover (block 714). For handover, the non-serving cell may receive a handover request from the serving cell, send a handover response to the serving cell, exchange signaling with the serving cell to transfer context of the UE, and receive a handover complete message from the UE after completing the handover. Additional, fewer and/or different messages may also be exchanged by the non-serving cell for the handover.

Figure 8:
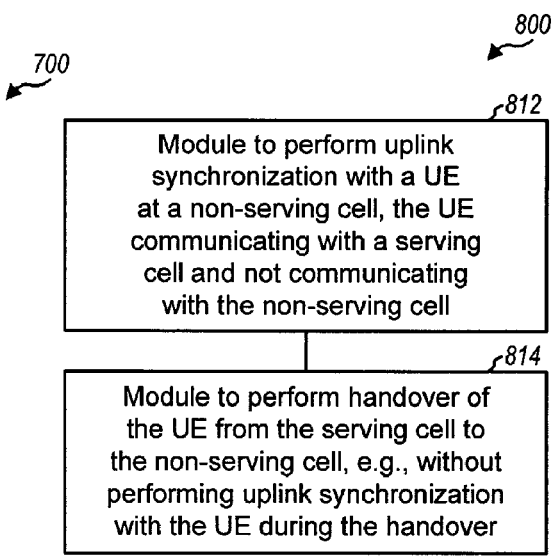
FIG. 8 shows an apparatus for a target/non-serving cell.

FIG. 8 shows a design of an apparatus 800 for a target/non-serving cell. Apparatus 800 includes means for performing uplink synchronization with a UE at the non-serving cell, where the UE may be communicating with a serving cell and not communicating with the non-serving cell (module 812), and means for performing handover of the UE from the serving cell to the non-serving cell, e.g., without performing uplink synchronization with the UE during the handover (module 814). Modules 812 and 814 may comprise processors, electronics devices, hardware devices, electronics components, logical circuits, memories, etc., or any combination thereof.

Figure 9:
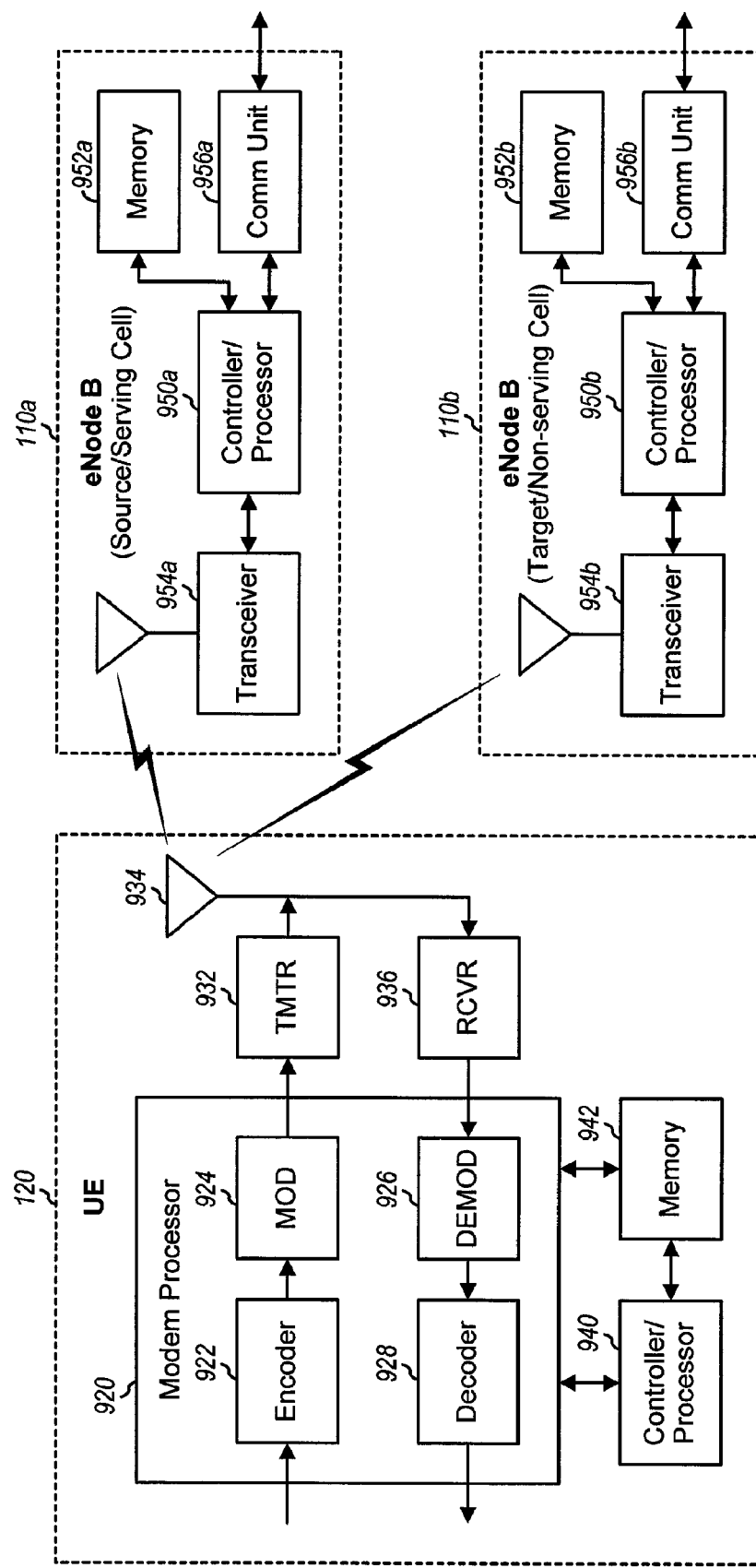
FIG. 9 shows a block diagram of a UE and two base stations (or eNode Bs).

FIG. 9 shows a block diagram of a design of a UE 120 and eNode Bs 110a and 110b, which may be one of the UEs and two of the eNode Bs in FIG. 1. On the uplink, data and signaling to be sent by UE 120 may be processed (e.g., formatted, encoded, and interleaved) by an encoder 922 and further processed (e.g., modulated, channelized, and scrambled) by a modulator (MOD) 924 to generate output chips. A transmitter (TMTR) 932 may then condition (e.g., convert to analog, filter, amplify, and frequency upconvert) the output chips to generate an uplink signal, which may be transmitted via an antenna 934. On the downlink, antenna 934 may receive downlink signals transmitted by eNode Bs 110a and 110b. A receiver (RCVR) 936 may condition (e.g., filter, amplify, frequency downconvert, and digitize) the received signal from antenna 934 and provide samples. A demodulator (DEMOD) 926 may process (e.g., descramble, channelize, and demodulate) the samples and provide symbol estimates. A decoder 928 may further process (e.g., deinterleave and decode) the symbol estimates and provide decoded data. Encoder 922, modulator 924, demodulator 926, and decoder 928 may be implemented by a modem processor 920. These units may perform processing in accordance with the radio technology (e.g., UTRA, E-UTRA, cdma2000, etc.) utilized by the wireless communication network.

A controller/processor 940 may direct the operation at UE 120. Controller/processor 940 may also perform process 500 in FIG. 5 and/or other processes for the techniques described herein. A memory 942 may store program codes and data for UE 120 and may also store uplink timing adjustments for non-serving cells.

Each eNode B 110 may include a controller/processor 950 that performs various functions for communication with the UEs, a memory 952 that stores program codes and data for the eNode B, a transceiver 954 that supports radio communication with the UEs, and a communication (Comm) unit 956 that supports communication with other network entities such as SAE gateway 130. Controller/processor 950 for a target/non-serving cell may perform process 600 in FIG. 6 and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE) apparatus comprising:
   at least one processor configured:
   to communicate with a serving cell,
   to determine when to initiate uplink synchronization with one or more non-serving cells of a candidate set of non-serving cells, the one or more non-serving cells having a signal quality above a first threshold for each of a plurality of times over a defined period of time;
   to perform, while being served by the serving cell, uplink synchronization with the one or more non-serving cells of the candidate set, the uplink synchronization initiated by the UE responsive to the determining and including:
      sending an access probe to the one or more non-serving cells; and
      receiving an uplink timing adjustment from the one or more non-serving cells in response to the access probe prior to sending a measurement report that results in a handover to a target non-serving cell of the candidate set; and
   to perform the handover from the serving cell to the target non-serving cell; and
   a memory coupled to the at least one processor.

2. The apparatus of claim 1, wherein the at least one processor is configured to maintain a link with only the serving cell and to maintain no links with the one or more non-serving cells.

3. The apparatus of claim 1, wherein the at least one processor is configured to perform the handover from the serving cell to the target non-serving cell without performing uplink synchronization during the handover.

4. The apparatus of claim 1, wherein to perform uplink synchronization with the one or more non-serving cells of the candidate set, the at least one processor is configured to adjust uplink timing for each of the one or more non-serving cells of the candidate set based on the uplink timing adjustment received from the non-serving cell.

5. The apparatus of claim 1, wherein the at least one processor is configured to perform uplink synchronization with only a strongest cell in the candidate set.

6. The apparatus of claim 1, wherein the at least one processor is configured to perform uplink synchronization with the one or more non-serving cells if a signal quality of the serving cell is below a predetermined threshold.

7. The apparatus of claim 1, wherein the at least one processor is configured to perform uplink synchronization with each cell in the candidate set if a signal quality of the serving cell is below a second threshold.

8. The apparatus of claim 1, in which the at least one processor configured to determine when to initiate uplink synchronization comprises the at least one processor configured to perform uplink synchronization with the one or more non-serving cells periodically at a predetermined rate.

9. The apparatus of claim 8, wherein the predetermined rate is based on an estimated speed of the apparatus.

10. The apparatus of claim 1, wherein the at least one processor is configured to receive a uplink synchronization update trigger from the serving cell or the one or more non-serving cells, and to perform uplink synchronization with the one or more non-serving cells in response to the uplink synchronization update trigger.

11. The apparatus of claim 1, wherein the at least one processor is configured to send the measurement report to the serving cell, the measurement report including measurements for a set of cells and an indication of whether uplink synchronization is achieved for each of the one or more non-serving cells in the candidate set.

12. The apparatus of claim 1, wherein to perform the handover the at least one processor is configured to receive a handover command from the serving cell and to send a handover complete message to the target non-serving cell.

13. A method performed by a user equipment, comprising:
   communicating with a serving cell;
   determining when to initiate uplink synchronization with one or more non-serving cells of a candidate set of non-serving cells, the one or more non-serving cells having a signal quality above a first threshold for each of a plurality of times over a defined period of time;
   performing, while being served by the serving cell, uplink synchronization with the one or more non-serving cells of the candidate set, the uplink synchronization initiated by the UE responsive to the determining and including:
      sending an access probe to the one or more non-serving cells; and
      receiving an uplink timing adjustment from the one or more non-serving cells in response to the access probe prior to sending a measurement report that results in a handover to a target non-serving cell of the candidate set; and performing the handover from the serving cell to the target non-serving cell.

14. The method of claim 13, wherein performing uplink synchronization with the one or more non-serving cells of the candidate set comprises:
adjusting uplink timing for each of the one or more non-serving cells of the candidate set based on the uplink timing adjustment received from the non-serving cell.

15. A user equipment apparatus comprising:
means for communicating with a serving cell;
means for determining when to initiate uplink synchronization with one or more non-serving cells of a candidate set of non-serving cells, the one or more non-serving cells having a signal quality above a first threshold for each of a plurality of times over a defined period of time;
means for performing, while being served by the serving cell, uplink synchronization with the one or more non-serving cells of the candidate set, the uplink synchronization initiated by the UE responsive to the determining and including:
sending an access probe to the one or more non-serving cells; and
receiving an uplink timing adjustment from the one or more non-serving cells in response to the access probe prior to sending a measurement report that results in a handover to a target non-serving cell of the candidate set; and
means for performing handover from the serving cell to the target non-serving cell.

16. The apparatus of claim 15, wherein the means for performing uplink synchronization with the one or more non-serving cells of the candidate set comprises:
means for adjusting uplink timing for each of the one or more non-serving cells of the candidate set based on the uplink timing adjustment received from the non-serving cell.

17. A non-transitory processor-readable medium including instructions stored thereon, comprising:
a first instruction set for directing communication by a user equipment (UE) with a serving cell;
a second instruction set for determining by the user equipment when to initiate uplink synchronization with one or more non-serving cells of a candidate set of non-serving cells, the one or more non-serving cells having a signal quality above a first threshold for each of a plurality of times over a defined period of time;
a third instruction set for performing, while being served by the serving cell, uplink synchronization with the one or more non-serving cells of the candidate set, the uplink synchronization initiated by the UE responsive to the determining and including:
sending an access probe to the one or more non-serving cells; and
receiving an uplink timing adjustment from the one or more non-serving cells in response to the access probe prior to sending a measurement report that results in a handover to a target non-serving cell of the candidate set; and
a fourth instruction set for performing the handover from the serving cell to the target non-serving cell.

18. The non-transitory processor-readable medium of claim 17, wherein the third instruction set comprises a fifth instruction set for adjusting uplink timing for each of the one or more non-serving cells of the candidate set based on the uplink timing adjustment received from the non-serving cell.

19. An apparatus comprising:
at least one processor configured:
to perform uplink synchronization with a user equipment (UE) at a non-serving cell of a candidate set of non-serving cells, while the UE is served by a serving cell and not served by the non-serving cell of the candidate set, the non-serving cell of the candidate set having a signal quality above a first threshold for each of a plurality of times over a defined period of time, the UE determining when to initiate uplink synchronization with the non-serving cell of the candidate set and the UE initiating uplink synchronization with the non-serving cell of the candidate set responsive to the determining, the uplink synchronization including:
receiving an access probe from the UE;
determining an uplink timing adjustment for the UE based on the received access probe; and
sending an access response with the uplink timing adjustment to the UE prior to receiving a measurement report that results in a handover of the UE from the serving cell to the non-serving cell of the candidate set; and
to perform the handover without performing uplink synchronization during the handover; and
a memory coupled to the at least one processor.

20. The apparatus of claim 19, in which the at least one processor is further configured to perform uplink synchronization with the UE periodically at a predetermined rate.

21. The apparatus of claim 19, wherein to perform the handover the at least one processor is configured to receive a handover request from the serving cell, to send a handover response to the serving cell, and to receive a handover complete message from the UE after completing the handover.

22. A method comprising:
performing uplink synchronization with a user equipment (UE) at a non-serving cell of a candidate set of non-serving cells, while the UE is served by a serving cell and not served by the non-serving cell of the candidate set, the non-serving cell of the candidate set having a signal quality above a first threshold for each of a plurality of times over a defined period of time, the UE determining when to initiate uplink synchronization with the non-serving cell of the candidate set and the UE initiating uplink synchronization with the non-serving cell of the candidate set responsive to the determining;
receiving an access probe from the UE;
determining an uplink timing adjustment for the UE based on the received access probe;
sending an access response with the uplink timing adjustment to the UE prior to receiving a measurement report that results in a handover of the UE from the serving cell to the non-serving cell of the candidate set; and
performing the handover without performing uplink synchronization during the handover.

23. An apparatus comprising:
means for performing uplink synchronization with a user equipment (UE) at a non-serving cell of a candidate set of non-serving cells, while the UE is served by a serving cell and not served by the non-serving cell of the candidate set, the non-serving cell of the candidate set having a signal quality above a first threshold for each of a plurality of times over a defined period of time, the UE determining when to initiate uplink synchronization with the non-serving cell of the candidate set and the UE initiating uplink synchronization with the non-serving cell of the candidate set responsive to the determining;
means for receiving an access probe from the UE;

means for determining an uplink timing adjustment for the UE based on the received access probe;

means for sending an access response with the uplink timing adjustment to the UE prior to receiving a measurement report that results in a handover of the UE from the serving cell to the non-serving cell of the candidate set; and means for performing the handover without performing uplink synchronization during the handover.

24. A non-transitory processor-readable medium including instructions stored thereon, comprising:

a first instruction set for performing uplink synchronization with a user equipment (UE) at a non-serving cell of a candidate set of non-serving cells, while the UE is served by a serving cell and not served by the non-serving cell of the candidate set, the non-serving cell of the candidate set having a signal quality above a first threshold for each of a plurality of times over a defined period of time, the UE determining when to initiate uplink synchronization with the non-serving cell of the candidate set initiating uplink synchronization with the non-serving cell of the candidate set responsive to the determining;

a second instruction set for receiving an access probe from the UE;

a third instruction set for determining an uplink timing adjustment for the UE based on the received access probe;

a fourth instruction set for sending an access response with the uplink timing adjustment to the UE prior to receiving a measurement report that results in a handover of the UE from the serving cell to the non-serving cell of the candidate set; and a fifth instruction set for performing the handover without performing uplink synchronization during the handover.

* * * * *